United States Patent [19]

Eppley

[11] Patent Number: 5,733,130
[45] Date of Patent: Mar. 31, 1998

[54] TAXIDERMIC EAR LINER

[76] Inventor: Brad Eppley, 205 E. Jones St., Millersburg, Ohio 44654

[21] Appl. No.: 751,473

[22] Filed: Nov. 19, 1996

[51] Int. Cl.[6] .................................................. G09B 23/00
[52] U.S. Cl. .................................................. 434/295; 434/296
[58] Field of Search ............................... 119/838, 850, 119/814; 434/295, 296, 297

[56] References Cited

U.S. PATENT DOCUMENTS

| 148,367 | 3/1874 | Howard | 119/850 |
|---|---|---|---|
| 745,264 | 11/1903 | Todd | 119/838 |
| 2,992,494 | 7/1961 | Jonas, Jr. | 434/296 |
| 3,742,679 | 7/1973 | Jordan | 119/250 |
| 3,780,452 | 12/1973 | Jackson | 434/296 |
| 3,791,383 | 2/1974 | Friedman | 119/850 |
| 4,233,942 | 11/1980 | Williams | 119/814 |
| 4,432,919 | 2/1984 | Rinehart | 434/296 |
| 4,479,457 | 10/1984 | Rotolo | 119/850 |
| 4,971,865 | 11/1990 | Nowlan | 434/296 |
| 5,472,765 | 12/1995 | Green | 434/296 |
| 5,495,828 | 3/1996 | Solomon et al. | 119/850 |

OTHER PUBLICATIONS

Brad Eppley, 1995 Buckeye Mannikins catalogue, p. 52, showing advertisement for Whitetail Deer Earliners.

*Primary Examiner*—Paul J. Hirsch
*Attorney, Agent, or Firm*—Michael C. Pophal; Ralph E. Jocke

[57] ABSTRACT

A taxidermic ear liner which includes an outer ear member (10) and a support member (34) in cooperative engagement to form an anatomically correct, pre-assembled, external ear for use in many taxidermic animal forms. A featured surface (38, 46, 76) which is modeled to resemble the hollows, ridges and furrows of the external ear of the animal is positioned within a passage (26) within the outer ear member. The featured surface can be made from elastomers or plastics.

21 Claims, 4 Drawing Sheets

TAXIDERMIC EAR LINER

TECHNICAL FIELD

This invention relates to the art and practice of taxidermy and the life simulating mounting of animal heads, particularly to the techniques for the support and display of the ear components of such heads.

BACKGROUND ART

The art of taxidermy has been practiced for centuries. Taxidermist have continually been striving to reproduce realistic, three-dimensional models of many species of animals. Great care is taken to anatomically mirror the form and structure of all external surfaces of an animal. Several features of animals are very difficult to accurately reproduce and require great skill of the taxidermist. One of these external features which is difficult to reproduce is the ear structure for mammals, such as deer, antelope, elk, boar and bear. The structure of the ears of these animals is formed by internal cartilage which can not become part of the finished taxidermic form. This cartilage forms not only the auricle of the ear, but also the structures at the base of the ear such as the concha, the tragus, antitragus and other irregular hollows, ridges and furrows which are part of the visible structure of these mammal ears.

These ear components which must be reproduced occur in an extensive variation of size configurations and consist of an epidermal envelop or cover which is integral with the skull portion of the animal's pelt. The cartilage which forms the auricle of the ear acts as a stiffener to define a generally concave, internally rounded or pointed outer portion which radially converges into a generally tubular base portion adjacent the skull. The most complex portion of the ear components are positioned in the generally tubular base portion of the ear adjacent the skull. Of course the ear components of a given specimen are generally identical in a reversed or complimentary aspect to the ear component attached to the opposite side of the head.

Previous to the mounting of the animal skin, the cartilage stiffeners are removed from the ear components and the pelt material is cleaned, tanned and appropriately conditioned for permanent mounting onto an appropriately sized animal form. Typically these prior art animal forms consist of forms which define the body, neck and head of the animal without any antlers or tusks, internal teeth, eyes or ears. At the appropriate stage of the pelt mounting operation, the ear component envelops of the pelt are extended and adjustably stiffened by means of suitable ear liners which are inserted within the pelt and attached to the animal form to display different positions of the animal ears.

U.S. Pat. No. 2,992,494 by Jonas described a thermoplastic ear liner which comprises an elongated shell like unit for insertion into the ear skin of the animal to define the auricle of the ear. The position of Jonas' ear liner on the animal form is fixed by clay or other bonding agent which requires long periods of time to harden, thus extending the time for mounting the animal pelt.

The Inventor also produces an ear liner which not only comprises the auricle portion of the ear, but also the base portion which is positioned adjacent the head of the animal form. The Inventor's ear liner also needs to be attached to the animal form by means of a bonding agent.

Both the prior art ear liners of the Inventor and of Jonas lack the structure of the concha, the tragus, antitragus and other hollows, ridges and furrows of the external ear. In the prior art, the taxidermist is still required to form these structures by inserting a plug of clay into the liner adjacent the base and molding the clay to reproduce these ear structures. In the prior art, the taxidermist was required to know the exact ear anatomy of the particular animal which he was trying to reproduce. In order to mold the clay inserts the taxidermist initially hydrates the clay. After time, when the clay insert dehydrates, the insert shrinks in the ear insert deforming the sculpted ear structure marring its appearance.

Thus there exists a need in the prior art for an ear liner which is easily mounted onto an animal form which produces reproducible, anatomically correct ear structure and reduces the time and simplifies the assemblage of the taxidermic animal ear.

DISCLOSURE OF THE INVENTION

An object of the present invention is to provide a taxidermic ear liner apparatus which is easily mounted onto an animal form prior to draping the pelt onto the animal form.

A further object of the present invention is to provide a taxidermic ear liner which provides reproducible, anatomically correct taxidermic ears.

A further object of the present invention is to provide a taxidermic ear liner which reduces the time and simplifies the assemblage of the ear components of animals.

A further object of the present invention is to provide a taxidermic ear liner which provides a means for mounting the animal ear in various positions on the animal form.

Further objects of the present inventions will be made apparent from the following Best Modes for Carrying Out Invention and the appended Claims.

The foregoing objects are accomplished in the preferred embodiment of the invention by a taxidermic ear liner for supporting and forming the pelt of an animal. The taxidermic ear insert of the present invention is adapted for attachment to an animal mannequin.

The taxidermic ear auricle comprises an outer ear member wherein the outer ear member is shaped to resemble the ear of the animal. The outer ear member comprises an auricle portion which is shaped to resemble the auricle of the ear of the animal. The auricle portion is generally concave shaped and extends longitudinally between a tapered first end and a generally annular second end.

The outer ear member further comprises a base portion. The base portion is shaped to resemble the base of the ear of the animal adjacent the skull of the animal. The base portion is generally annularly shaped and comprises an inner wall which generally surrounds a passage. The passage extends between a first end and a second end with a bottom surface of the base portion positioned at the first end, and the second end of the auricle portion positioned at the second end.

In the preferred embodiment of the invention the passage is hollow and featureless. However in an alternative embodiment of the present invention the outer ear member includes a featured surface which is positioned in the passage adjacent the second end of the base portion.

The taxidermic ear auricle further comprises a support member which is sized to be insertable within the passage through the first end. The support member is generally cylindrical and has an outer surface which is oriented to engage the inner wall of the outer ear member when the support member is positioned within the passage. In the preferred embodiment of the present invention the support member includes a featured surface which is oriented to generally face towards the auricle portion when the support member is positioned within the passage. The featured surface is shaped to resemble the hollows, ridges and furrows of the ear of the animal. The support member is attachable to an animal mannequin which resembles the shape of the head of the animal. The support member includes at least one fastener hole wherein each fastener hole is sized to accept a fastener which connects the support member to the animal mannequin.

The support member further includes a ridge portion. When the support member is inserted into the passage the bottom surface of the outer ear member engages the ridge portion. The support member further includes a mount surface which is positioned adjacent to and in engagement with the animal mannequin when the support member is attached to the animal mannequin. In the preferred embodiment of the present invention the support member is comprised of a thermoplastic material. In an alternative embodiment of the invention the featured surface, which is positioned with the passage, is manufactured from an elastomer material.

BRIEF DESCRIPTION OF DRAWINGS

In a preferred embodiment of the invention an apparatus for a taxidermic ear liner apparatus is described herein in detail with reference to the accompanying drawings.

BEST MODES FOR CARRYING OUT INVENTION

Figure 1:
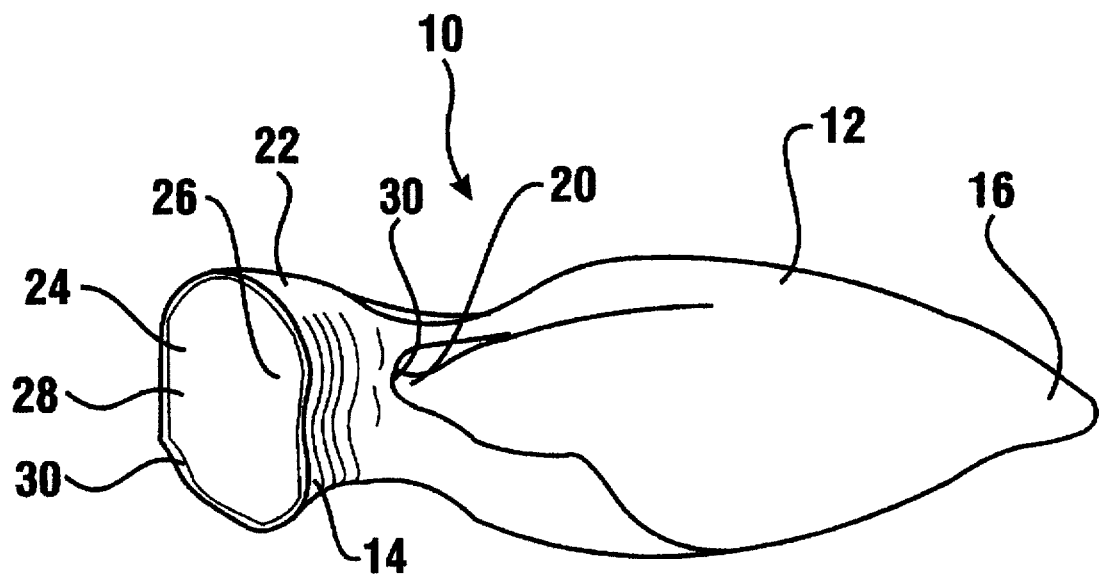
FIG. 1 is a perspective view of the outer ear member of the taxidermic ear liner of the present invention.

Referring now to the drawings, particularly to FIG. 1, the outer ear member 10 of the present invention is shown. The outer ear member 10 comprises an auricle portion 12 and a base portion 14. The auricle portion is shaped to resemble the auricle of the ear of the desired animal. In FIGS. 1-6 the ear structure of a white tailed deer is shown. The surface of the auricle portion contains many features, including protruding blood vessels and characteristic curves, and extends between a first end 16 and a second end 20. The auricle portion is tapered at the first end and is generally concave shaped from the first end to the second end. The curvature of the auricle portion increases towards the second end and terminates in a generally annular second end.

The base portion 14 is also shaped to resemble the base of the ear of the animal, in this case a white tail deer. The base portion is generally annularly shaped and comprises an outer wall 22 which is ornamented with skin folds and protruding blood vessels so as to resemble the external surface of a white tail deer ear. The base portion further consists of an inner wall 24 which is generally unornamented and smooth and which generally surrounds a passage 26. The passage extends between an open and generally circular first end 28 and a generally circular and open second end 30. The second end of the base portion is adjacent to and in communication with the second end 20 of the auricle portion. The base portion further includes a bottom surface 32 which extends about the perimeter of the second end and is generally planar.

The outer ear member is made of an extremely flexible thermoplastic and has excellent adhesion qualities for affixing the pelt of the animal to it. The outer ear member is pre-colored and transparent to light and produces deer ears with a slight transparency and pinkish color.

Figure 2:
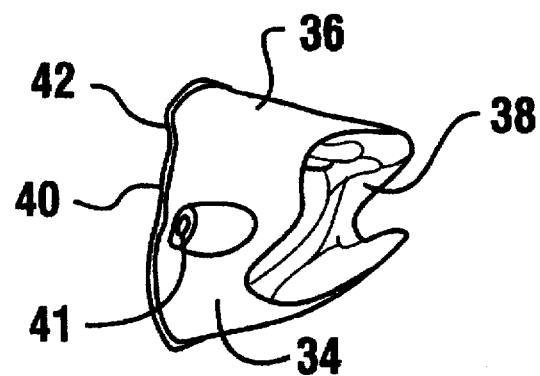
FIG. 2 is a perspective view of the support member of the taxidermic ear liner of the present invention with a featured surface.

Referring now to FIG. 2 there is shown a support member 34 of the present invention. The support member is sized to be insertable within the first end 28 of the passage 26. The support member is generally cylindrical and includes an outer surface 36 which is oriented to be positioned adjacent to the inner wall 24 when the support member is positioned within the passage. The support member further includes a featured surface 38. The featured surface is oriented to generally face towards the auricle portion when the support member is positioned within the passage. When so positioned, the featured surface is visible through the second end 20 of the auricle portion and is shaped to resemble the hollows, ridges and furrows of the ear of the desired animal. The featured surface includes anatomically correct projections resembling the concha, tragus, antitragus and other features of the external surface of the animal ear.

The support member is adapted to be attachable to the animal mannequin at a position on the head of the animal. For this purpose the support member includes a mount surface 40 which is generally planar and adapted for engagement with a mating surface on the animal mannequin. The support member further includes at least one fastener hole 41 through which appropriately sized fasteners can be screwed or otherwise connected to the animal mannequin. These fasteners rigidly affix the support member to the surface of the animal mannequin. Alternatively the support member can be incorporated as an integral part of the animal mannequin. In this alternative embodiment, two support members are molded with the animal mannequin on opposed sides of the head of the mannequin.

The support member is further adapted to support the outer ear member 10. The support member includes a ridge portion 42 which extends circumferentially about the support member adjacent the mount surface 40. When the support member has been affixed to the animal mannequin the inner wall 24 of the outer ear member is coated with adhesive and the outer ear member is positioned on the support member so that the support member extends through the passage 26. In the correct position the bottom surface 30 is in full engagement with the ridge portion 42. The support member like the outer ear member is made of a thermoplastic and is appropriately colored.

Figure 3:
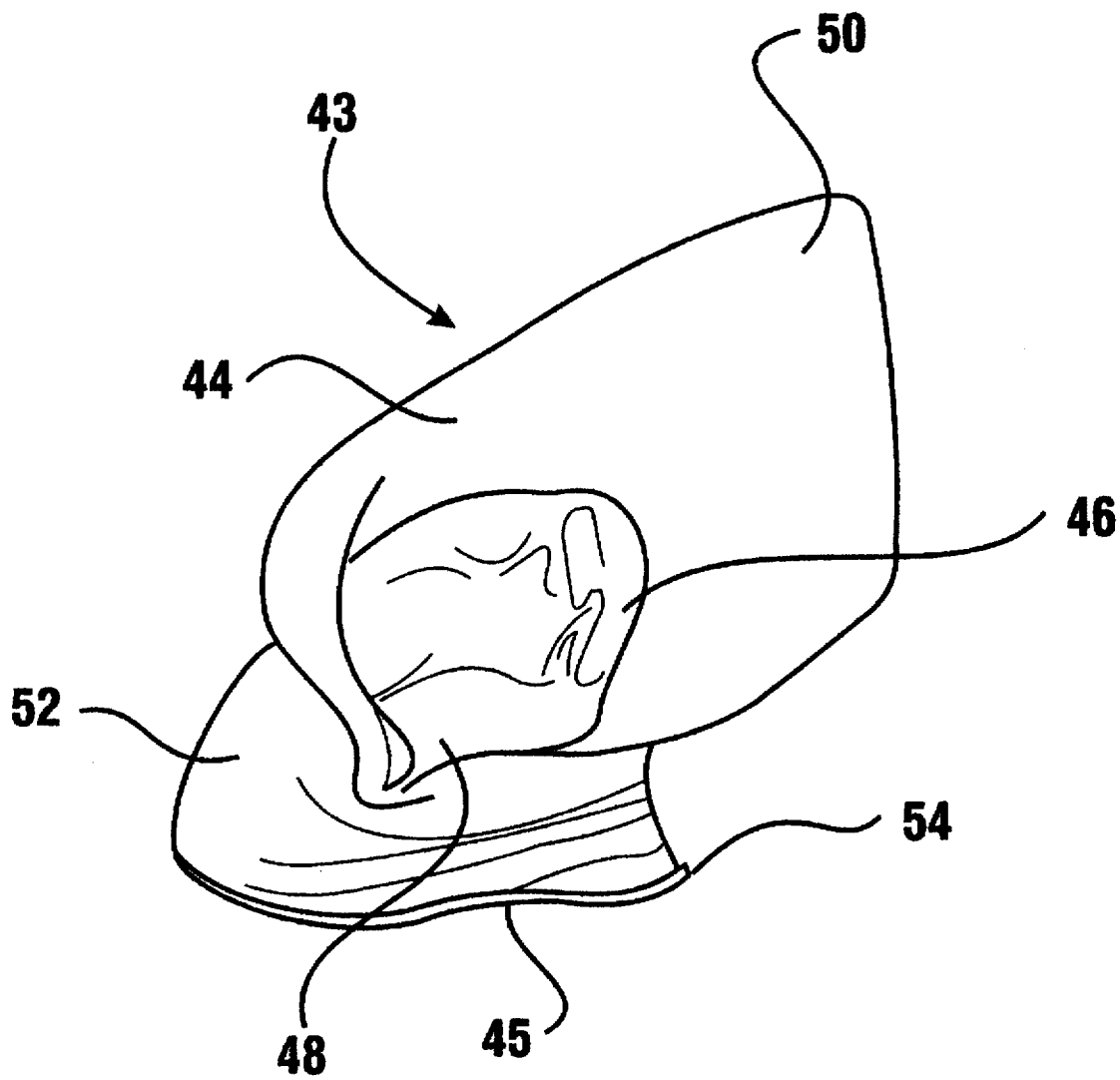
FIG. 3 is a perspective view of the taxidermic ear liner of the present invention showing the support member inserted into the outer ear member.

Referring now to FIG. 3 there is shown the assembled taxidermic ear liner 43 of the present invention. The taxidermic ear liner is composed of the assembled outer ear member 44 and the support member 45. The side elevational view shown in FIG. 3 shows the featured surface 46 visible through the passage 48. As assembled the featured surface, together with the auricle portion 50 and the base portion 52, closely reproduce the visible external ear of a white tail deer. The ridge portion 54 of the support member can be seen protruding from the first end of the base portion 52. The ridge portion allows the support member to be positioned within the passage so that the featured surface is positioned in anatomically correct orientation.

Figure 4:
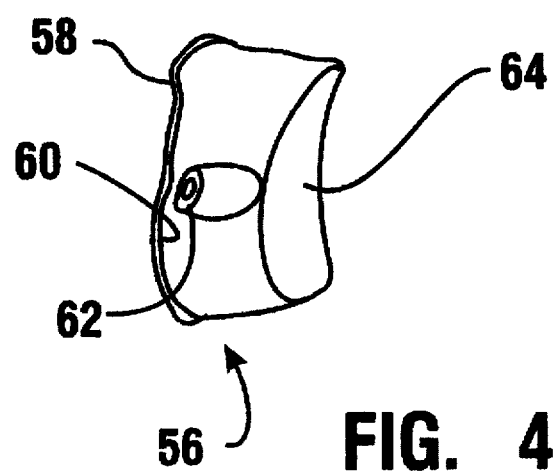
FIG. 4 is a perspective view of an alternative embodiment of the invention showing the support member without a featured surface.

Referring now to FIG. 4 there is shown an alternative embodiment of the support member 56. The support member includes a mount surface 58 which is generally planar and located at a base of the support member. The support member further includes a ridge portion 60 which extends circumferentially about the support member adjacent the mount surface. Similar to the preferred embodiment, the support member further includes at least one fastener hole 62 through which fasteners can be extended to secure the position of the support member onto the mannequin form. Alternatively the support member can be molded integrally to an animal mannequin.

In this alternative embodiment of the support member a featured surface is not included, instead a featureless surface 64 extends in generally parallel arrangement with the mount surface. This embodiment of the support member can be used when the details of the inner ear are not required by the taxidermist or when the support member is used in conjunction with the below described alternative embodiment of the outer ear member described with relation to FIG. 6.

Figure 5:
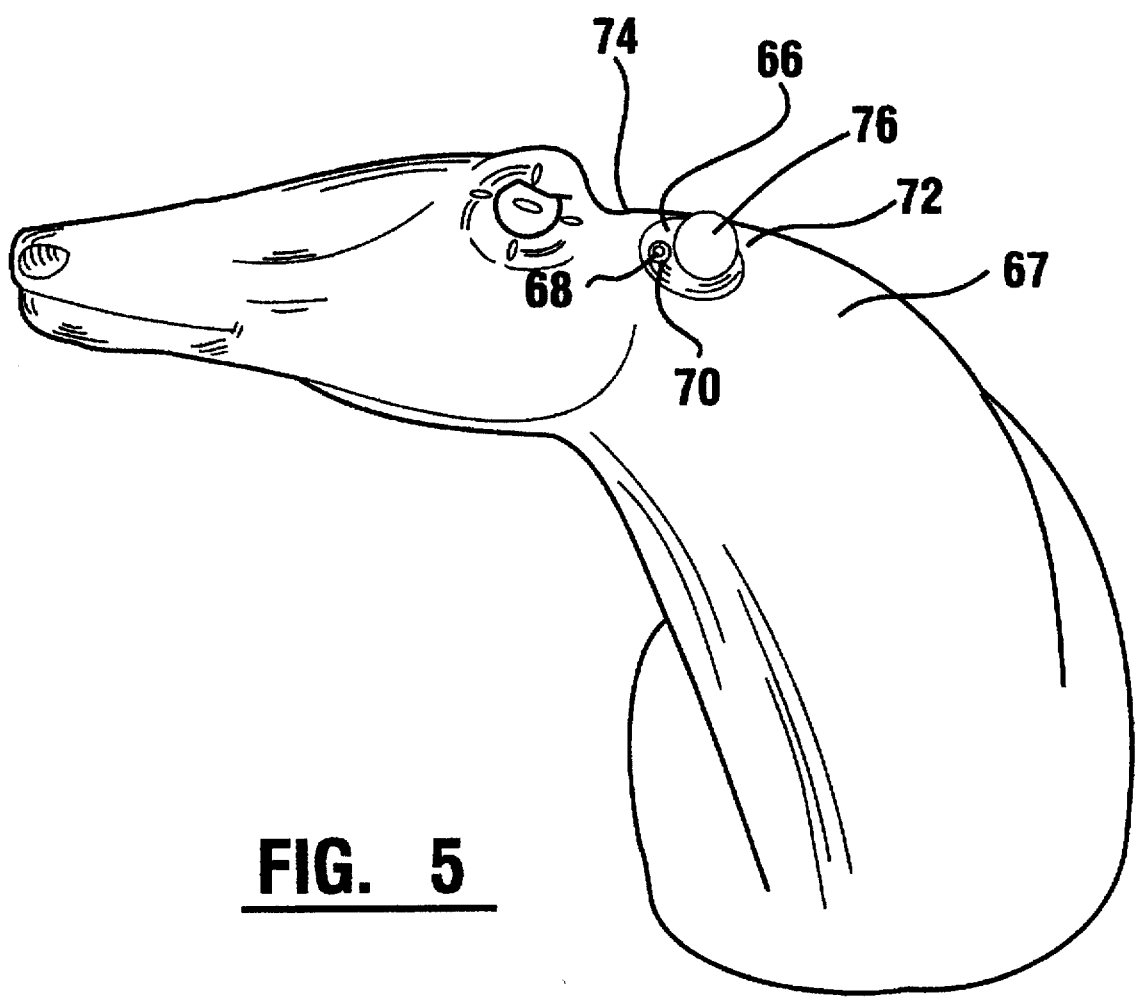
FIG. 5 is a side elevational view of an animal mannequin shown with the support member of the present invention affixed in its proper position.

Referring now to FIG. 5 there is shown a support member 66 secured to an animal mannequin 67 by fasteners 68. The fasteners 68 extend through each respective fastener hole 70 and into the body of the animal mannequin. The support member 66 is positioned on a ear mounting surface 72 of the animal mannequin which is contoured to mate with the mount surface of the support member. The ear mounting surface is positioned in a location on the animal mannequin below a rack mounting surface 74. Of course a similar ear mounting surface and support member are positioned on the opposed side of the animal mannequin. The support member further includes a featured surface 76 which faces generally away from the animal mannequin for orientation within the passage of an outer ear member. The support member 66 can be positioned in various orientations on the animal mannequin so that the taxidermist can position the ear of the animal in any desired natural position. As discussed above, the support members can alternatively be integrally molded to the animal mannequins.

Figure 6:
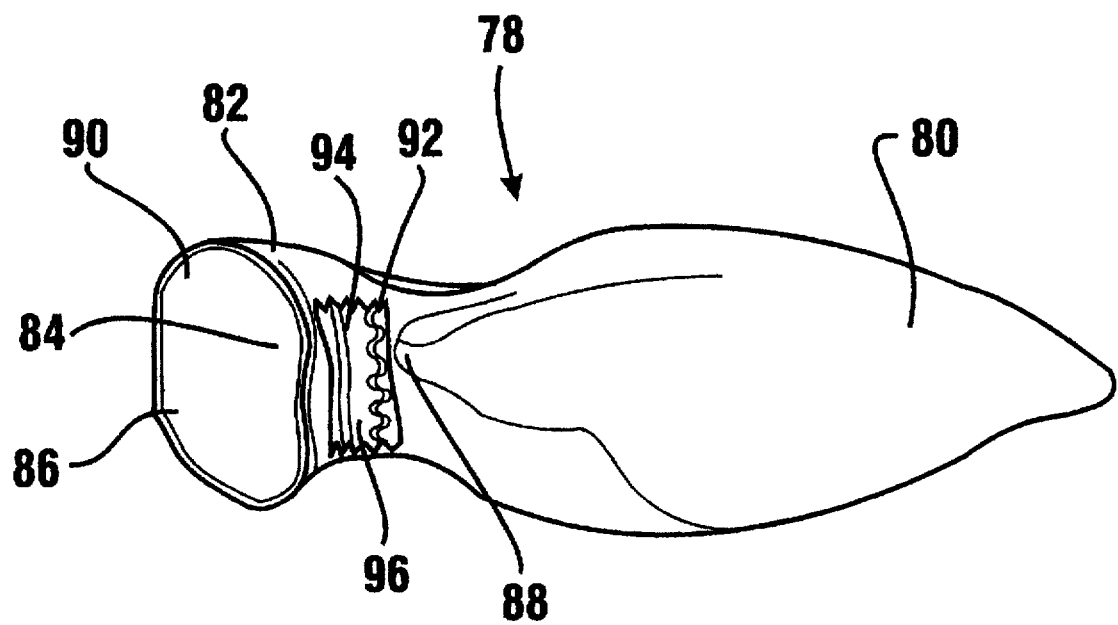
FIG. 6 is a side elevational, cut away view of an alternative embodiment of the outer ear member with a featured surface positioned within the passage.

Referring now to FIG. 6 there is shown an alternative embodiment of the outer ear member 78. Similar to the above-described preferred embodiment of the outer ear member 10, the outer ear member 78 includes an auricle portion 80 and a base portion 82. The base portion includes a passage 84 which extends from a first end 86 to a second end 88. The passage 84 is defined and surrounded by an inner wall 90. In this alternative embodiment of the outer ear member a featured surface assembly is formed within the passage 84. The featured surface assembly can be seen through a cut away of the surface of the base portion 82.

The featured surface assembly first comprises a featured membrane 92 which extends across the passage and is affixed to the inner wall about its perimeter by any suitable adhesive. The featured membrane consists of a pressed membrane on which the concha, tragus, antitragus and other hollows, ridges and furrows of the ear are featured in their anatomically correct orientation. The featured membrane is positioned with the passage adjacent the second end 88 so that it may be viewed through the second end. A back membrane 94 is also positioned within the passage 84 by being adhesively fixed to the inner wall in a generally parallel arrangement with the featured membrane. The back membrane is longitudinally disposed within the passage from the featured membrane and is positioned in the passage in close proximity to the featured membrane.

The back membrane and the featured membrane 92, 94, together with the inner wall, bound a cavity 96 which initially is comprised of air caught between the two membranes. After the adhesives affixing the featured membrane and back membrane to the inner wall have cured, fully securing the membranes, a hole is drilled through the back membrane. A liquid urethane or similar material is then poured into the cavity and left to solidify. The solidified liquid urethane provides a rigid backing for the membranes and further secures them within the passage.

Both the featured membrane and the back membrane are preferably pre-molded from room temperature vulcanization rubber, but can alternatively be molded from other elastomers, plastic or thermoplastic elastomers. This alternative embodiment of the outer ear member 78 is preferably provided with the featured membrane assembly preassembled. However, alternatively the featured membrane assembly can be sold with the outer ear member shell in the form of a kit. As described above, the outer ear member 78 can be mounted onto a support member with a featureless surface as described in conjunction with FIG. 4. The resulting assemblage of support member and outer ear member is externally viewed like the assembly depicted in FIG. 3.

The above-described embodiments of the support member and the outer ear member include a support member which substantially extends within the outer ear member. Apart from the featured surface which is visible through the passage of the outer ear member, the support member is generally not visible when the taxidermic ear liner is assembled. In the preferred embodiments of the invention the outer ear member is ornamented to resemble the external features of the animal ear. This ornamented external surface of the outer ear member extends to the ridge portion of the support member. The seam between the ridge portion and bottom surface of the outer ear member is not visible when the ear liner of the present invention is covered by the pelt of the animal.

Alternatively, the seam between the support member and the outer ear member can be positioned at alternative longitudinally disposed configurations. One such alternative configuration includes the support member being externally ornamented about its outer surface so that it resembles the base of the ear of an animal. The ridge portion of this alternative embodiment comprises a ledge longitudinally positioned near the featured surface of the support member for acceptance of the bottom surface of the outer ear member. The outer ear member substantially comprises an auricle portion and the bottom surface of the outer ear member engages the ledge when the outer ear member is assembled onto the support member.

The pre-assembled featured surface, whether it is positioned within the outer ear member or on the support member, provides an anatomically correct, reproducible, authentic and natural looking animal ear. Unlike the modeled clay which is used to form the internal cartilage of the ear in the prior art, the featured surfaces of the present invention do not shrink or otherwise deform. These pre-assembled ear liners save the taxidermist time and reduce the price of the taxidermist work product.

Thus the invention achieves the above stated objectives, eliminates difficulties encountered in the use of prior devices, solves problems and attains the desirable results described herein.

In the foregoing description, certain terms have been used for brevity, clarity and understanding. However no unnecessary limitations can be implied therefrom because such terms are for descriptive purposes and are intended to be broadly construed. Moreover, the descriptions and illustrations are by way of examples and the invention is not limited to the details shown or described.

Having described the features, discoveries and principles of the invention, the manner in which it is constructed, and the advantages and useful results obtained; the new and useful structures, devices, elements, arrangements, parts, combinations, systems, equipment, operations and relationships are set forth in the appended claims.

I claim:

1. A taxidermic ear article for supporting and forming the skin of an animal comprising:

an outer ear member, wherein said outer ear member is shaped to resemble the ear of said animal, wherein said outer ear member comprises a base portion, wherein said base portion is generally annular shaped and comprises an inner wall, said inner wall generally surrounding a passage, a support member wherein said support member is nonpliable and is sized to be insertable within said passage, wherein said support member is preformed before being inserted in said passage, wherein said support member includes a featured surface, wherein said featured surface is shaped to resemble the hollows, ridges and furrows of the ear of said animal, whereby said support member and said outer ear member form an anatomically correct external ear of said animal when said support member is inserted within said passage.

2. The article of claim 1, wherein said support member is generally cylindrical, and wherein said support member has an outer surface which is oriented to engage said inner wall when said support member is positioned within said passage.

3. The article of claim 1, wherein said outer ear member comprises an auricle portion, wherein said auricle portion is shaped to resemble the auricle of the ear of said animal, wherein said auricle is generally concave shaped and extends longitudinally between a generally tapered first end and a generally annular second end.

4. The article of claim 3, wherein said featured surface is oriented to generally face towards said auricle portion when said support member is positioned within said passage.

5. The article of claim 1, wherein said base portion is shaped to resemble the base of the ear of said animal.

6. The article of claim 3, wherein said passage extends from a bottom surface of said base portion to said second end of said auricle portion.

7. The article of claim 1, wherein said support member is attachable to a taxidermy form resembling the shape of the head of said animal.

8. The article of claim 7, wherein said support member further includes at least one fastener hole, wherein said fastener hole is sized to accept a fastener which connects said support member to said taxidermy head form.

9. The article of claim 6, wherein said support member further includes a ridge portion, wherein when said support member is inserted into said passage, said bottom surface engages said ridge portion.

10. The article of claim 1 wherein said support member is fastened within said passage.

11. The article of claim 1, wherein said support member is of a thermoplastic material.

12. The article of claim 1, wherein said support member is of an elastomer material.

13. A taxidermic ear article for attachment to an animal mannequin comprising:

a support member, wherein said support member is nonpliant and preformed and includes a mount surface which is generally planar and adapted for engagement with a mating surface on said animal mannequin, an outer ear member, wherein said outer ear member is shaped to resemble the ear of said animal, wherein said outer member is attachable to said support member, whereby when said support member is attached to said animal mannequin and said outer ear member is attached to said support member said ear article is rigidly secured to the animal mannequin and immediately ready for the affixation of a pelt.

14. The article of claim 13, wherein said outer ear member comprises a base portion, wherein said base portion is generally annular shaped and comprises an inner wall, said inner wall generally surrounding a passage, wherein said support member is insertable within said passage.

15. The article of claim 14, wherein said support member includes a ridge portion extending circumferentially about said support member, wherein said base portion engages said ridge portion when said support member is inserted within said passage.

16. The article of claim 13 wherein said support member further includes a featured surface, wherein said featured surface is shaped to resemble the hollows, ridges and furrows of the ear of said animal.

17. The article of claim 13, wherein said outer ear member includes a passage extending through said outer ear member between a first end and a second end, wherein said support member is insertable in said passage through said first end.

18. The article of claim 17, wherein said outer ear member includes a featured surface positioned in said passage adjacent said second end.

19. The article of claim 13, wherein said support member is adapted to accept fasteners which secure said support member to said animal mannequin.

20. The article of claim 13, wherein said support member is an integral part of said animal mannequin.

21. A taxidermic ear article for supporting and forming the skin of an animal comprising:

an outer ear member, wherein said outer ear member is shaped to resemble the ear of said animal, wherein said outer ear member comprises a base portion, wherein said base portion is generally annular shaped and comprises an inner wall, said inner wall generally surrounding a passage, a support member wherein said support member is nonpliable and is sized to be insertable within said passage, wherein said support member includes a featured surface, wherein said featured surface faces out of said passage when said base portion is positioned within said passage, wherein said featured surface is preformed with hollows, ridges and furrows which are accurately shaped to model the anatomical features of the external ear of said animal, whereby said support member and said outer ear member form an anatomically correct external ear of said animal when said support member is inserted within said passage.

* * * * *